United States Patent
Lamm et al.

(10) Patent No.: US 11,318,835 B2
(45) Date of Patent: May 3, 2022

(54) DRIVE TRAIN FOR A VEHICLE

(71) Applicant: VOLKSWAGEN AKTIENGESELLSCHAFT, Wolfsburg (DE)

(72) Inventors: Eugen Lamm, Wolfsburg (DE); Bjoern Becker, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 180 days.

(21) Appl. No.: 16/784,542

(22) Filed: Feb. 7, 2020

(65) Prior Publication Data

US 2020/0254871 A1 Aug. 13, 2020

(30) Foreign Application Priority Data

Feb. 7, 2019 (DE) .................... 10 2019 201 585.9

(51) Int. Cl.
| | |
|---|---|
| B60K 17/16 | (2006.01) |
| F16H 37/04 | (2006.01) |
| F16H 57/03 | (2012.01) |
| F16H 57/04 | (2010.01) |
| F16H 57/037 | (2012.01) |
| F16H 57/02 | (2012.01) |

(52) U.S. Cl.
CPC ........... *B60K 17/16* (2013.01); *F16H 37/042* (2013.01); *F16H 57/037* (2013.01); *F16H 57/0423* (2013.01); *F16H 57/0453* (2013.01); *F16H 57/0457* (2013.01); *F16H 57/0471* (2013.01); *F16H 57/0483* (2013.01); *F16H 2057/02052* (2013.01)

(58) Field of Classification Search
None
See application file for complete search history.

(56) References Cited

U.S. PATENT DOCUMENTS

| | | | | |
|---|---|---|---|---|
| 2,031,584 | A | * | 2/1936 | Austin .................... F16H 37/08 74/366 |
| 3,605,516 | A | * | 9/1971 | Hausinger ............... F16C 19/54 74/401 |

(Continued)

FOREIGN PATENT DOCUMENTS

| | | |
|---|---|---|
| DE | 102015013973 A1 | 5/2016 |
| JP | 2005278319 A | 10/2005 |
| JP | 2018087615 A | 6/2018 |

OTHER PUBLICATIONS

EP 20150962.7 Writtern Search Opinion dated Sep. 6, 2020 (Year: 2020).*

*Primary Examiner* — Colby M Hansen
(74) *Attorney, Agent, or Firm* — Laurence A. Greenberg; Werner H. Stemer; Ralph E. Locher

(57) ABSTRACT

A drive train for a vehicle includes a drive shaft, a transmission, a differential, and a wheel drive shaft. An axle drive gear wheel of the differential and a gear wheel of the transmission, which mesh with one another are at least partially in the oil sump in a splashing fashion. An end plate has a bearing retainer for receiving a bearing. The efficiency of the drive train is increased and splashing losses are avoided by the end plate, which has a flange-like circumferential region extending radially in the direction of the oil sump. At least one of the end plate or the circumferential region is or are formed to divide the oil sump into a first and a second oil sump region.

13 Claims, 6 Drawing Sheets

(56) References Cited

U.S. PATENT DOCUMENTS

| | | |
|---|---|---|
| 9,278,618 B2 | 3/2016 | Valler et al. |
| 9,856,971 B2 | 1/2018 | Mikami et al. |
| 11,105,400 B2 * | 8/2021 | Meixner ............... F16H 57/082 |
| 2008/0128208 A1 | 6/2008 | Ideshio et al. |
| 2009/0127954 A1 | 5/2009 | Mogi |
| 2016/0123455 A1 | 5/2016 | Mikami et al. |
| 2018/0172138 A1 | 6/2018 | Nakano et al. |
| 2019/0032769 A1 | 1/2019 | Ohkawa et al. |

\* cited by examiner

DRIVE TRAIN FOR A VEHICLE

CROSS-REFERENCE TO RELATED APPLICATION

This application claims the priority, under 35 U.S.C. § 119, of German patent application DE 10 2019 201 585, filed Feb. 7, 2019; the prior application is herewith incorporated by reference in its entirety.

BACKGROUND OF THE INVENTION

Field of the Invention

The invention relates to a drive train for a vehicle, in particular for a motor vehicle. The drive train has at least one drive shaft, at least one transmission, at least one differential, and at least one wheel drive shaft. The differential has at least one axle drive gear wheel and the axle drive gear wheel is in engagement with at least one gear wheel of the transmission. At least one oil sump region is provided and at least one of the axle drive gear wheel or a gear wheel of the transmission is arranged at least partially in the oil sump region in a splashing fashion. At least one end plate is provided for at least one of the arrangement or for the mounting of the differential. The end plate has at least one bearing retainer for at least one of receiving or arranging a bearing.

A plurality of drive trains for motor vehicle are known in the prior art. These firstly have a drive shaft, a transmission, a differential and at least one wheel drive shaft. In this case, the drive torque or the flow of force runs from the drive motor (this can be an internal combustion engine or an electric motor) via a drive shaft, possibly via a clutch and via a transmission to at least one wheel drive shaft. In the case of a plurality of drive trains, a differential is arranged in a functionally active manner functionally between the transmission and the wheel drive shaft. In this case, the differential generally has an axle drive gear wheel which is in engagement or can be in engagement with a gear wheel of the transmission.

In the prior art from which the invention proceeds, namely, U.S. Pat. No. 9,278,618 B2, the drive train for a vehicle, in particular for a motor vehicle, is formed substantially as follows: A drive motor, in that case an electric motor, drives a drive shaft. A first pinion which is in engagement with a first gear wheel arranged on an intermediate shaft sits on the drive shaft. A second pinion which in turn is in engagement with the axle drive gear wheel of a differential is arranged or formed on the intermediate shaft. The flow of force is therefore transmitted from the drive shaft to the axle drive gear wheel of the differential with the aid of the existing transmission, wherein the transmission provided here is formed in particular as a spur gear. At least the first pinion formed on the drive shaft, the gear wheel arranged on the intermediate shaft and the second pinion arranged or formed on the intermediate shaft are present as gear wheels of the transmission. It is also conceivable that the axle drive gear wheel of the differential is considered as a (further) gear wheel of the transmission, in particular of the spur gear, which is dependent on the point of view. In any event, the axle drive gear wheel of the differential is in engagement with a second pinion formed on the intermediate shaft.

The drive train from which the invention proceeds is formed in particular as what is known as a coaxial drive or as a coaxial drive train. In this case, an end plate is thus provided for at least one of the arrangement or mounting of the differential, wherein the flow of force is transmitted via the axle drive gear wheel of the differential to in particular both wheel drive shafts and at least one wheel drive shaft is arranged coaxially with respect to the drive shaft, in particular at least partially within the drive shaft formed as a hollow shaft.

This drive train formed in such a manner and known in the prior art also has in particular several housing regions/housing parts. In particular a first housing region/first housing part for at least one of mounting or enclosing the drive motor, in particular the electric motor and the drive shaft as well as a second housing region/second housing part for at least one of enclosing or delimiting the differential as well as the transmission region having the corresponding gear wheels.

In the case of the drive train known in the prior art, from which the invention proceeds, the axle drive gear wheel of the differential is thus provided or arranged so that it splashes at least partially in an oil sump provided the lower region of the housings. In other words, an oil sump region is substantially provided in which the axle drive gear wheel of the differentials is arranged at least partially in a splashing fashion. Since, in the case of the drive train explained above, the differential is arranged to be substantially centrally axially centered, in particular centrally axially centered like the electric machine, the end plate has a passage opening for at least one of the arrangement or passage of at least one wheel drive shaft. The end plate furthermore additionally has a bearing retainer for at least one of arranging or receiving a bearing, with the help of which the differential or the differential housing and/or the axle drive gear wheel of the differential can then be mounted on one side (of two sides). In this case, the end plate is then provided and/or arranged between the drive motor, in particular the electric machine (the electric motor) and the differential body, in particular therefore arranged substantially "on the motor side".

In the case of the drive train known in the prior art, the end plate has a flange-like circumferential region for fastening of the end plate as well as an end plate body which extends substantially at a right angle to the circumferential region formed in a flange-like manner. As a result of this formation, a bearing retainer is formed with the aid of further walls which are then overhanging. In this case, the flange-like circumferential region extends substantially on one side, upward radially outward away from the central axis of the wheel drive shaft or from the drive shaft. Finally, a very wide oil sump region which is jointly present for the drive motor and the differential/transmission is provided, in which oil sump region the axle drive gear wheel of the differential splashes at least partially.

The drive train known in the prior art is not yet, however, formed optimally. On the one hand, the end plate, as a result of its constructive configuration, takes up a relatively large space or requires a corresponding large space during mounting and in its mounted end position. The drive train furthermore has a relatively large/wide "joint" oil sump region for certain components such as the drive motor and the differential/transmission. This leads in particular in the case of dipping of the axle drive gear wheel into the oil sump region to high splashing losses since the oil sump region is not only relatively large/wide, but the depth of the joint oil sump region is also substantially the same over the width of the oil sump region. This structural outlay also arising as a result of this is associated with corresponding further costs, wherein the efficiency of the drive train explained above is not yet optimal.

BRIEF SUMMARY OF THE INVENTION

It is accordingly an object of the invention to provide a drive train, which overcomes the above-mentioned and other disadvantages of the heretofore-known devices and methods of this general type and which provides for a generally improved drive train such that, on the one hand, splashing losses are reduced, and on the other hand efficiency is increased and in particular the linking of a differential in a simple and space-saving manner is enabled and/or the costs are reduced.

With the above and other objects in view there is provided, in accordance with the invention, a drive train for a vehicle, in particular for a motor vehicle. The drive train comprises:

a drive shaft, a transmission, a differential, and a wheel drive shaft;

the differential including an axle drive gear wheel in meshing engagement with a gear wheel of the transmission;

the axle drive gear wheel and/or the gear wheel of the transmission being at least in part arranged in an oil sump in a splashing fashion;

an end plate for mounting the differential, the end plate having a bearing retainer for receiving a bearing;

the end plate having a flange-shaped circumferential region extending radially in a direction of the oil sump; and the end plate being disposed and configured to divide the oil sump into a first oil sump region and a second oil sump region.

In other words, the end plate has at least one flange-like circumferential region extending at least partially radially in the direction of the oil sump. In this case, the end plate and/or the circumferential region is or are formed and/or arranged in such a manner that, as a result of this, the oil sump is divided into a first and into a second oil sump region. This firstly has the advantage that two oil sump regions are now provided or present and/or formed which can be optimally adapted to the respective circumstances. On one hand, splashing losses of the axle drive gear wheel can thus be reduced, on the other hand the respective oil sump region optimally adapted and/or adjusted to the respective specific circumstances. In particular, the respective first and second oil sump regions can thus have different depths or as a result of this also different hydraulic oil levels. In the case of the preferred embodiment, the height of the oil or its level in the first and second oil sump region are of the same height or lies on the same level, wherein the respective depth of the respective oil sump region has, however, a different configuration. This will be explained in even greater detail below.

The first oil sump region can be formed to be smaller in terms of volume than the second oil sump region. Due to the fact that the axle drive gear wheel splashes in the first oil sump region, the splashing losses are reduced and the efficiency of the drive train is correspondingly increased.

As a result of the realization of the flange-like circumferential region of the end plate which extends in the direction of the oil sump region, in particular divides the entire oil sump region into a first and a second oil sump region, a flow of the oil from the second oil sump region into the first oil sump region can be at least partially prevented and/or controlled in a targeted manner with the aid of the end plate. This also leads in particular to a calming of the oil in the first oil sump region, at least waves which are generated, for example, in the second oil sump region by moving components cannot reach the first oil sump region in particular because the end plate, for this purpose, realizes at least partially a corresponding sealing off of the first and second oil sump region from one another. With the aid of the end plate, the inflow of oil, in particular from the second oil sump region into the first oil sump region (or vice versa) can furthermore be at least partially controlled and/or regulated, in particular a targeted and/or guided oil collection, in particular to a separately arranged oil container is enabled, which will also be explained in even greater detail below.

The bearing retainer of the end plate has a support wall for axial support of the bearing arranged in the bearing retainer. The flange-like circumferential region of the end plate and the support wall lie substantially in a or the same plane and/or can be formed correspondingly, in particular in one piece, in particular the end plate can be produced as a cast part. Due to the fact that the support wall and the flange-like circumferential region of the end plate lie substantially in one and the same plane, corresponding space can be saved in the arrangement of the end plate between the differential and the housing part enclosing the drive motor, in particular the electric motor, in comparison with the prior art.

The bearing retainer of the end plate is at least partially delimited by a collar-shaped wall which runs at least partially annularly substantially perpendicular to the plane of the support wall and/or the circumferential region. As a result of this, the receiving and arrangement of the bearing within the end plate or in the bearing retainer is correspondingly simplified.

The end plate has a substantially flattened region for the arrangement of at least one oil container radially opposite to the direction of the oil sump region. In other words, an oil container can then be arranged in a simple manner on the upper region of the end plate which is formed in a flattened manner.

So that the lubrication of the bearing arranged in the bearing retainer of the end plate is ensured, the end plate has, for lubrication of this bearing arranged in the bearing retainer, an oil intake region which is formed to be at least partially ramp-shaped. This oil intake region formed in a ramp-shaped manner can be supplied or can be connected in terms of flow with the oil of an oil container arranged on the flat region of the end plate via an oil outlet region of the oil container. In particular the oil runs to the bearing arranged in the bearing retainer via the ramp-shaped oil intake region.

The end plate can have, in particular in addition to the realization of a flow connection between the first and the second oil sump region, at least one through opening and/or is arranged and/or formed so that an annular gap is provided and/or formed at least between the outermost circumferential region, i.e. the lower circumferential region extending in the direction of the oil sump region, or the outer circumferential edge region and a housing part (or several housing parts). As a result of this, oil can flow in particular from the second oil sump region into the first oil sump region (or also vice versa). A targeted and/or guided oil collection or oil guiding, which will be explained in even greater detail below, is therefore in any event then also conceivable and possible.

The transmission is formed in particular as a spur gear and has at least two gear wheel stages. In particular a first gear wheel stage is formed from a first pinion and a first gear wheel, wherein the first pinion is formed on the drive shaft and the gear wheel sits or is arranged on an intermediate shaft. The intermediate shaft then furthermore has a further gear wheel, here then in particular a second pinion which is in engagement with the axle drive gear wheel of the differential. The transmission is in particular formed from the first pinion, the gear wheel which is in engagement with the first pinion and arranged on the intermediate shaft and the second pinion, wherein the first pinion and the gear wheel arranged on the intermediate shaft form the first gear wheel stage and the second pinion and the axle drive gear wheel form the second gear wheel stage of the transmission. A targeted oil guidance from the first oil sump region to the oil container, which may once again be described briefly in greater detail below, can furthermore be realized in a simple manner with the aid of the end plate and its formation as well as in particular also by the formation of the axle drive gear wheel.

As a result, the above-mentioned disadvantages are avoided and corresponding advantages are achieved.

There are thus a plurality of possibilities of configuring and further developing the drive train according to the invention in an advantageous manner. Several advantageous and alternative features which are considered as characteristic for the invention are set forth in the appended claims.

Although the invention is illustrated and described herein as embodied in a drive train for a vehicle, in particular for a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
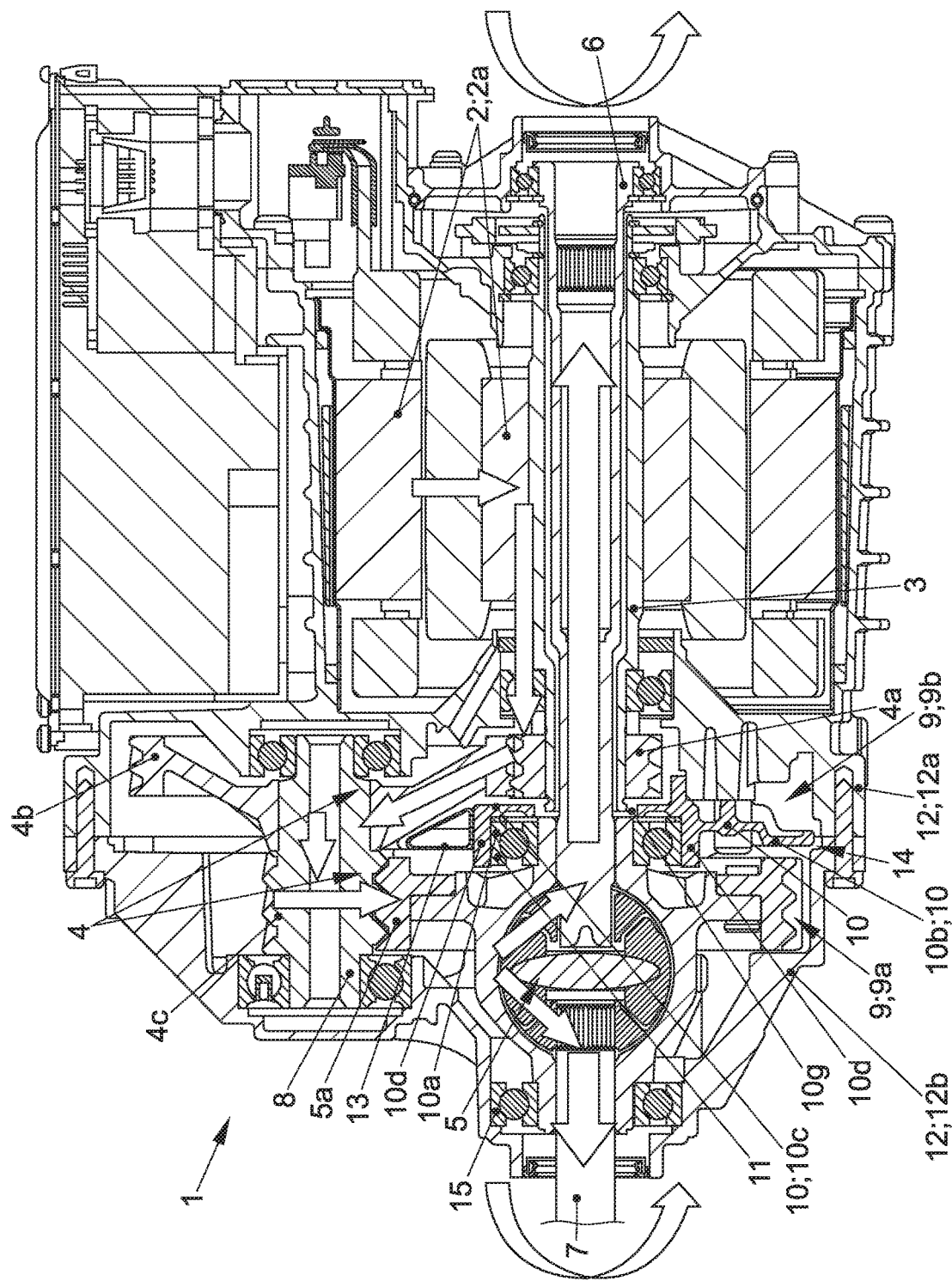
FIG. 1 shows a drive train according to the invention in a schematic representation partially in section with the respective components.

Referring now to the figures of the drawing in detail, FIGS. 1 to 7 show at least partially a drive train 1 for a vehicle, in particular for a motor vehicle. The vehicle is not illustrated in greater detail.

With reference to FIG. 1, the drive train 1 is initially represented schematically in greater clarity with all the key components. The drive train 1 has substantially here a drive motor 2, in particular an electric motor 2a, a drive shaft 3, a transmission 4, a differential 5 and two wheel drive shafts 6 and 7. It is clearly apparent that differential 5 has an axle drive gear wheel 5a. Transmission 4 is formed here in particular by a first pinion 4a which is in engagement with a gear wheel 4b arranged, in particular fixedly, on an intermediate shaft 8. There is formed or provided on intermediate shaft 8 a further pinion (then so-called "second") 4c which is then in active engagement with axle drive gear wheel 5a. Transmission 4 is therefore in particular functionally formed from first pinion 4a, gear wheel 4b, second pinion 4c and axle drive gear wheel 5a as well as intermediate shaft 8. In particular, transmission 4 is, in the case of the preferred embodiment represented here, formed as a spur gear and in particular two gear wheel stages are present which are then formed in particular by first pinion 4a and gear wheel 4b (first gear wheel stage) and by second pinion 4c and axle drive gear wheel 5a (second gear wheel stage). The two wheel drive shafts 6 and 7 drive the corresponding wheels, not represented here, of the motor vehicle, wherein here in particular wheel drive shaft 6 extends coaxially to the right in FIG. 1 through drive shaft 3 formed as a hollow shaft or is correspondingly arranged extending through drive shaft 3.

Figure 2:
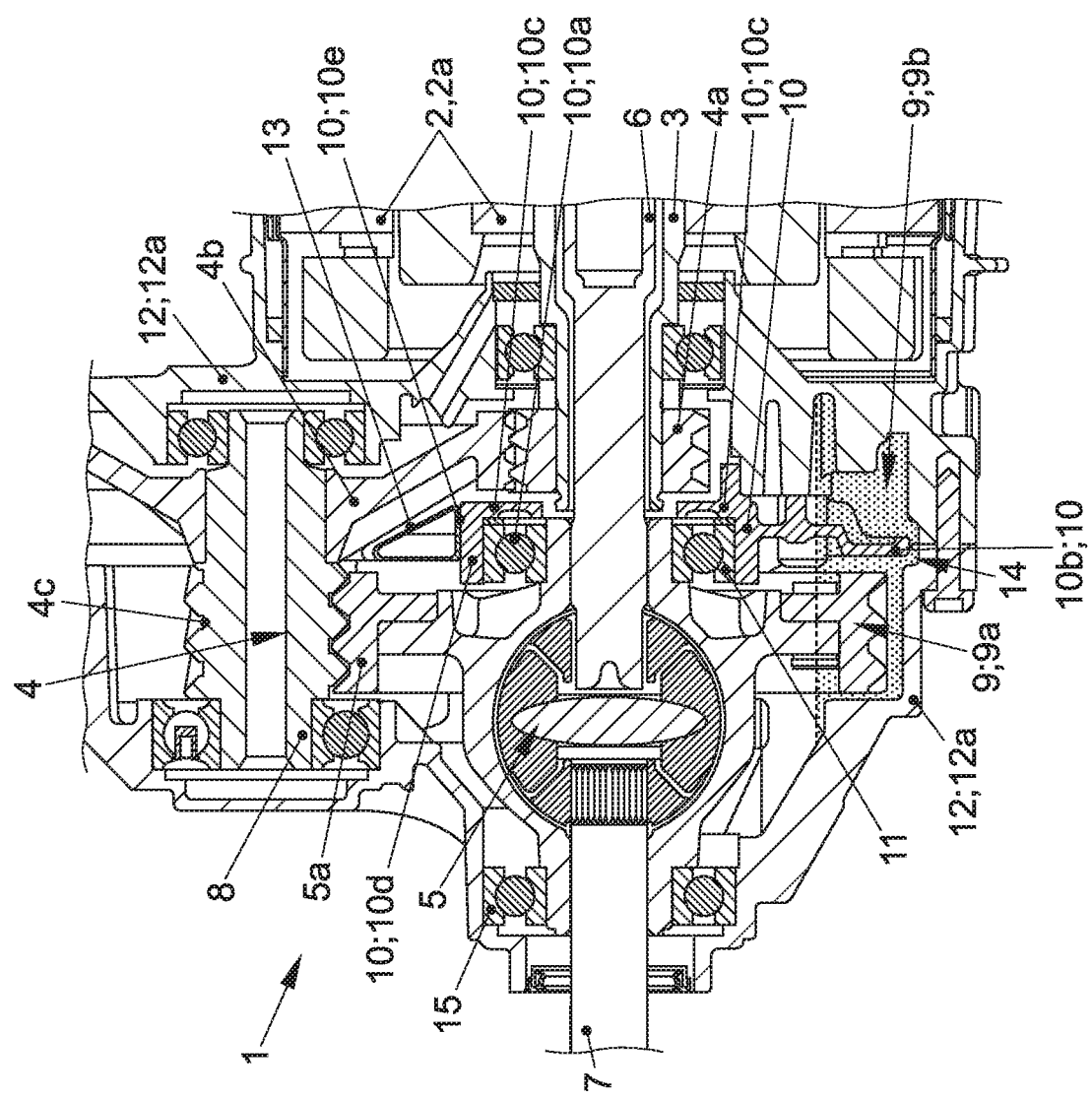
FIG. 2 shows, in a schematic representation, an enlarged cut-out of the drive train represented in FIG. 1 with the schematic representation of the first and second oil sump region as well as the schematic representation of an oil level.

As is furthermore clearly apparent in FIG. 1 and FIG. 2, an oil sump 9, or oil sump region 9, is provided or present, wherein in particular here axle drive gear wheel 5a is thus splashingly (i.e., in a splashing fashion) arranged at least partially in oil sump region 9. Depending on the embodiment, it is also conceivable that at least partially other gear wheels of the transmission are also splashingly arranged in the oil sump region—arranged therein in a splashing fashion.

At least one end plate 10 is provided and/or present for arrangement and/or mounting of differentials 5. End plate 10 has at least one bearing retainer 10a for receiving and/or mounting a bearing 11.

Drive train 1 represented at least partially in FIGS. 1 and 2 can correspondingly have further and/or additional components. In particular motor 2 can be formed in particular as an electric machine, but also as an internal combustion engine, in the case of the preferred embodiment represented here drive motor 2 is formed in particular as an electric motor 2a. This is dependent on the respective dimensioning and/or arrangement or formation and/or use (employment) of the drive train.

In FIG. 1, corresponding arrows schematically represent the flow of force from drive motor 2 to the wheels not represented in detail here or to wheel drive shafts 6 and 7.

Figure 3B:
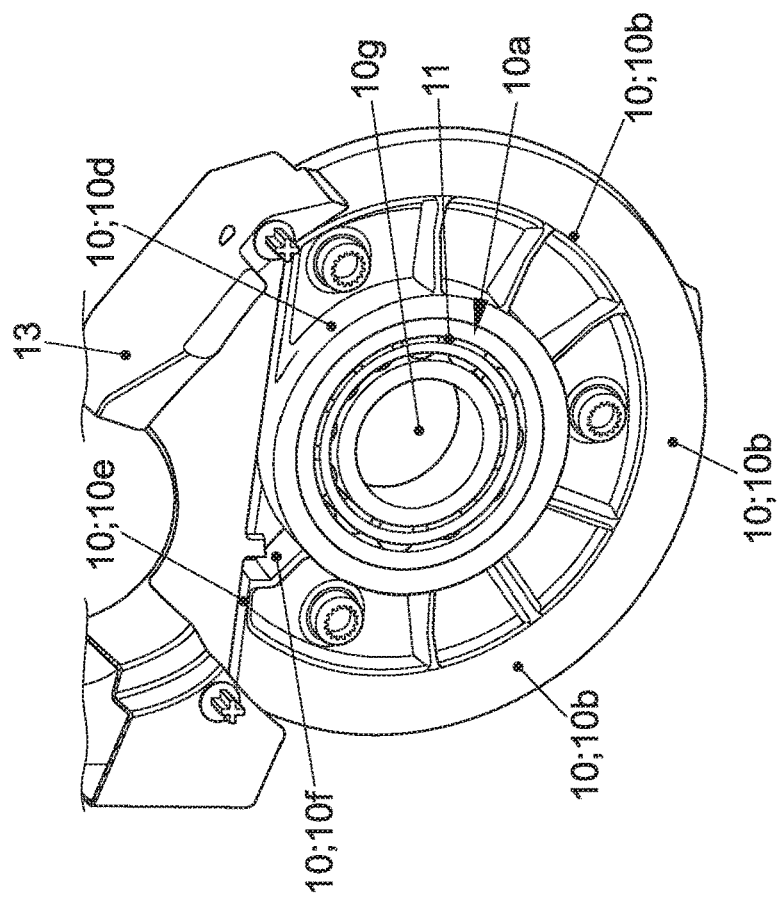
FIGS. 3A, 3B show an end plate, represented schematically from the rear side (FIG. 3A) or from the front side (FIG. 3B), the latter in particular with a bearing arranged in the bearing retainer, as well as an oil container in a respective schematic representation represented schematically in FIG. 3A and FIG. 3B and arranged on the flattened region of the end plate.
Figure 3A:
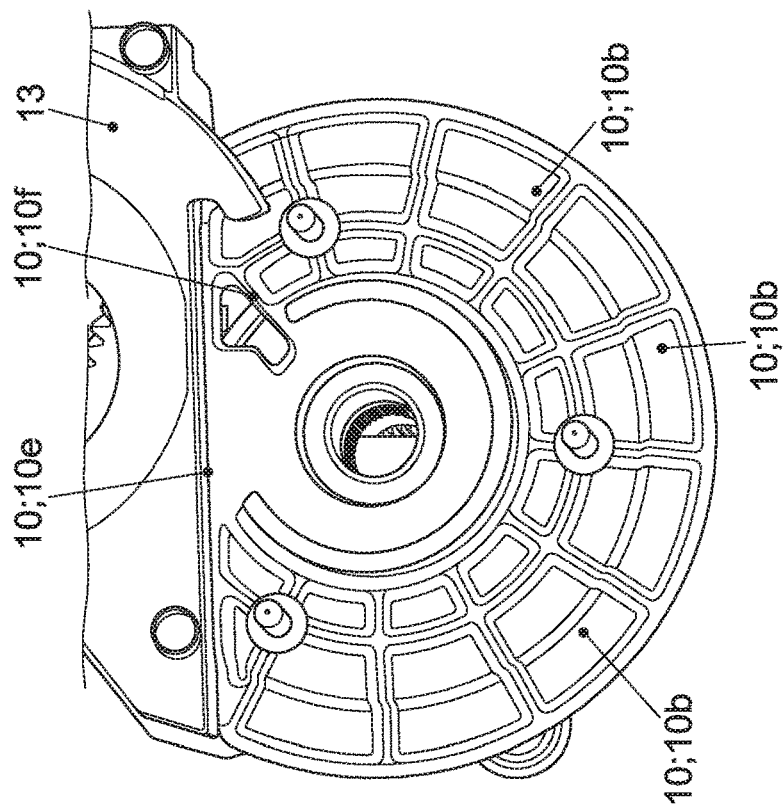
Figure 4B:
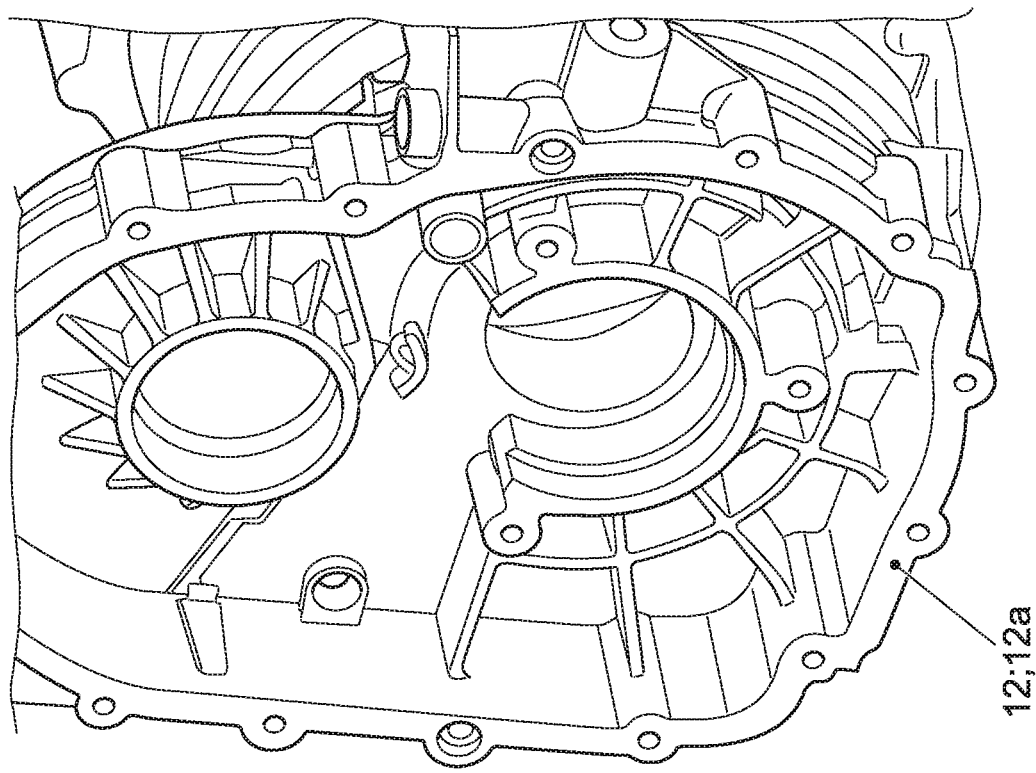
FIGS. 4A, 4B show, in a partial joint view and schematic representation, the desired arrangement of the end plate with its rear side or the corresponding centering of the end plate on a housing part.
Figure 4A:
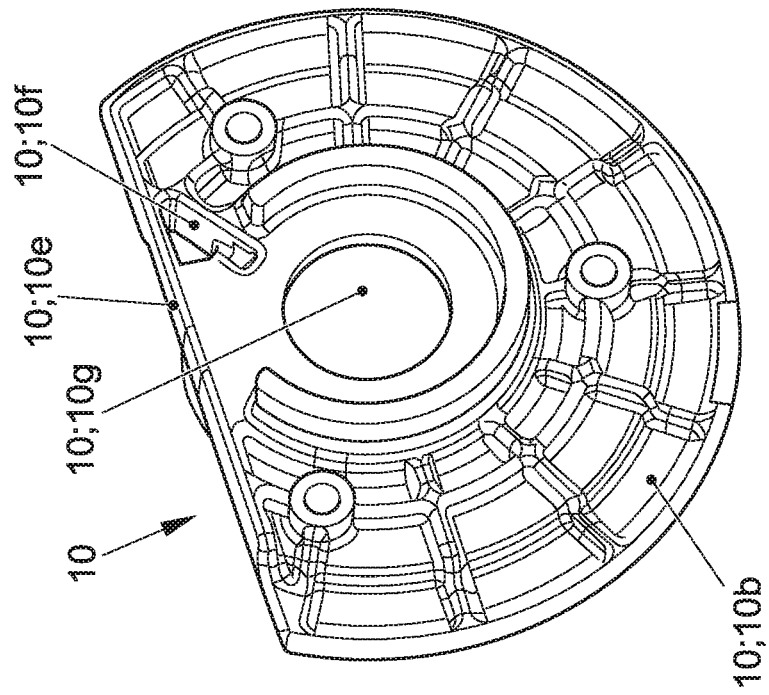
Figure 5:
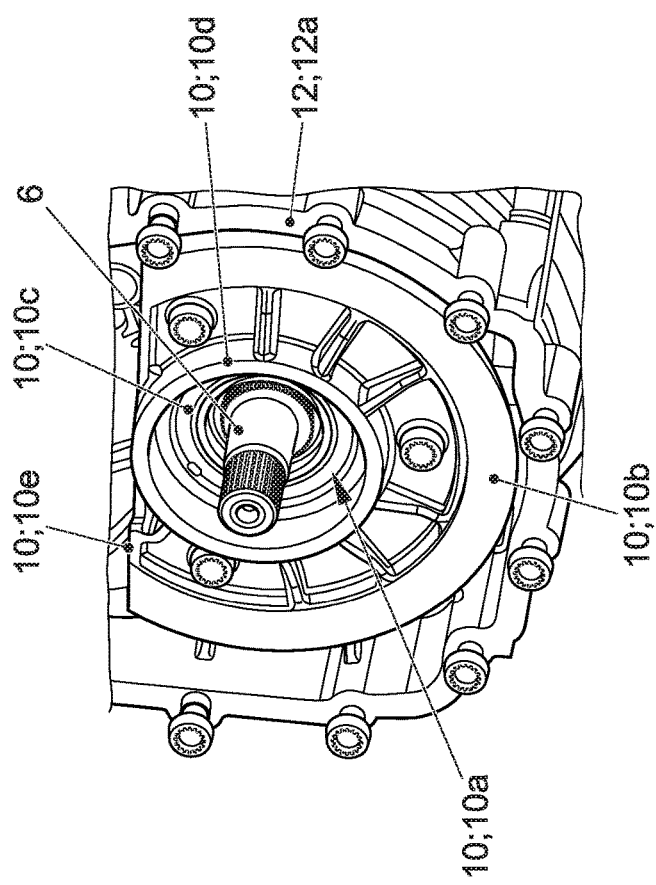
FIG. 5 shows the end plate arranged on the housing part with the bearing retainer without a bearing in a schematic representation.
Figure 6:
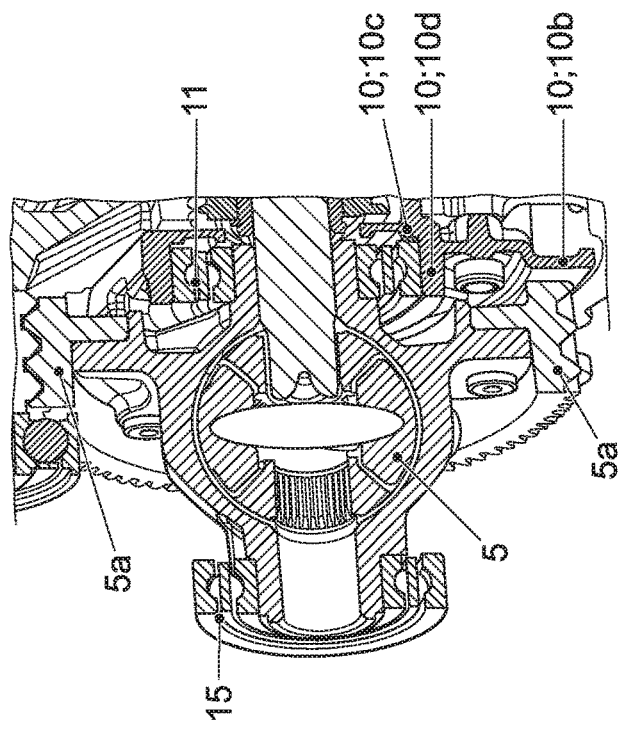
FIG. 6 shows in a schematic, partially sectioned schematic representation the differential or axle drive gear wheel mounted with the aid of a bearing and the end plate in the mounted position.
Figure 7:
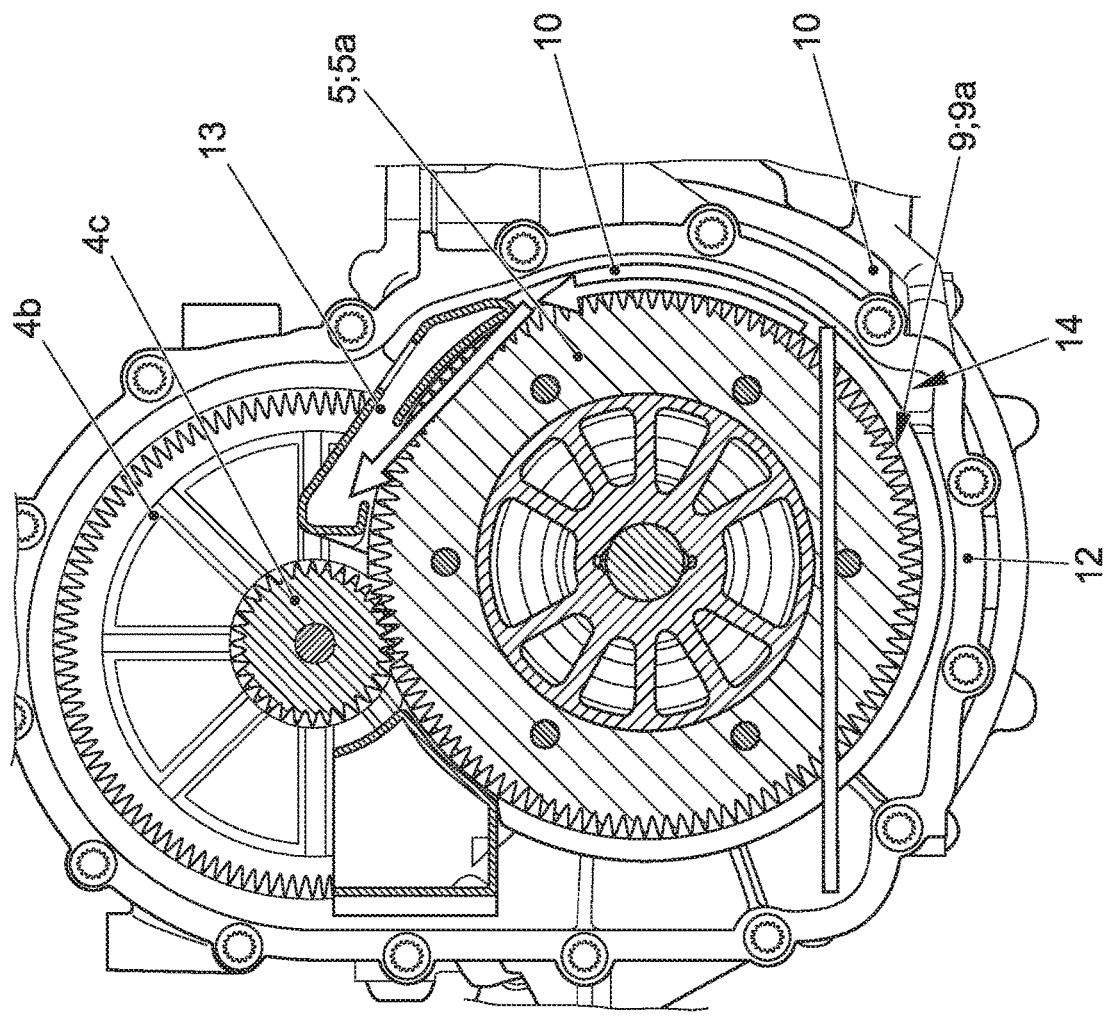
FIG. 7 shows in a partially schematic representation, in partial section the first oil sump region with oil level and the flow or the supply of the oil with the aid of the axle drive gear wheel and the arranged end plate in the direction of the oil container.

End plate 10 arranged here between differential 5 and drive motor 2 is also clearly apparent in FIGS. 1 and 2 or its arrangement and positioning are clearly apparent, wherein the formation of end plate 10, the rear side of which is apparent in FIG. 3A and the front side of which is apparent in FIG. 3B or its centering on housing 12 or on housing part 12a is supposed to be represented schematically in FIGS. 4A and 4B, is also represented in FIG. 7 relative to axle drive gear wheel 5a apparent there. In this context, reference can once again be made to FIGS. 5 and 6 here.

The above-mentioned disadvantages are thus firstly avoided in that end plate 10 has at least one flange-like circumferential region 10b which extends radially in the direction of oil sump region 9, wherein end plate 10 and/or circumferential region 10b is or are formed and/or arranged so that oil sump 9, as a result of this, is divided into a first and into a second oil sump region 9a and 9b. The latter is clearly apparent in particular from FIG. 2 and the schematic representation there of respective oil sump regions 9a and 9b.

As a result of the division of entire oil sump 9 into a first and a second oil sump region 9a and 9b, corresponding advantages are achieved, in particular the efficiency of drive train 1 is improved, in particular splashing losses are reduced in the case of axle drive gear wheel 5a. A "calming" of the oil sump in first oil sump region 9a is also performed since no wave movements can travel from second oil sump region 9b into first oil sump region 9a. As a result of end plate 10, an at least partial, in particular substantially complete separation of oil sump region 9 into the two other oil sump regions 9a and 9b is quasi realized.

In particular, this is apparent from FIG. 2, first oil sump region 9a is formed to be smaller in terms of volume than second oil sump region 9b. In this case, axle drive gear wheel 5a is arranged in first oil sump region 9a in a splashing fashion. Due to the fact that first oil sump region 9a is formed to be smaller in terms of volume, measured in particular in its vertical height has a lower oil level than second oil sump region 9b, splashing losses of axle drive gear wheel 5a can also be reduced.

FIGS. 1 and 2 and also FIG. 6 illustrate that, with the aid of end plate 10, a flow of the oil from second oil sump region 9b into first oil sump region 9a is at least partially prevented, in particular with the aid of end plate 10 the inflow of oil from second oil sump region 9b into first oil sump region 9a (or vice versa) can be at least partially regulated and/or controlled in a targeted manner. In particular, with the aid of end plate 10, a targeted and/or guided oil collection and/or corresponding oil guidance is/are enabled, which may be explained again in greater detail below, in particular also on the basis of FIG. 7.

As a result, several advantages are achieved by a configuration of end plate 10 with a relatively simple structure.

End plate 10 is formed to be structurally particularly advantageous. Bearing retainer 10a of end plate 10 has a support wall 10c for axial support of bearing 11 arranged or to be arranged in bearing retainer 10a. The latter is also in particular clearly apparent from FIGS. 5 and 6. At least partially flange-like circumferential region 10b of end plate 10 and support walls 10c of end plate 10 lie substantially in one and the same plane or are formed lying correspondingly in the same plane. This leads to end plate 10 substantially not having a body extending in the axial direction which unnecessarily increases the spatial axial size of the end plate. As a result of this not only is simpler mounting of the components realized in terms of construction, but rather corresponding costs are also reduced in particular in relation to the formation of all the further housing regions and/or housing parts (12a/12b) or this is reduced. The term "substantially" means here in particular that the axial spacing of support wall 10c from flange-like circumferential region 10b (measured from the respective center of the respective walls) is not greater than 20 mm, in particular lies in the range from up to 10 mm to 20 mm, in particular is not greater than 15 mm. An oil collection for first pinion 4a can additionally be realized with the aid of support wall 10c or an elongation of support wall 10c radially inward.

Bearing retainer 10a of end plate 10 is delimited at least partially, in particular circumferentially fully by a collar-like wall 10d running annularly substantially perpendicular to the plane of support wall 10c and/or of circumferential region 10b. The latter is particularly clearly apparent from FIG. 5. In this case, the expression "substantially" means that small deviations of +/−3 to 5 degrees can occur in the case of the corresponding angles.

In particular FIGS. 3A and 3B as well as FIG. 4A show that end plate 10 has a substantially flattened region 10e radially opposite to the direction of oil sump region 9 (9a, 9b) for the arrangement of at least one oil container 13.

FIGS. 3A and 3B show an oil container 13 arranged on flattened region 10e of the end plate. In particular FIGS. 3A and 3B as well as FIG. 4A furthermore show that end plate 10 has, for lubrication of bearing 11 arranged in bearing retainer 10a, an oil intake region 10f which is formed to be at least partially ramp-shaped and which can be supplied with oil from arranged oil container 13 in terms of flow, which is in particular also supposed to be indicated by the correspondingly represented arrows. It is thus ensured that a bearing 11 arranged in bearing retainer 10a can also be correspondingly supplied with oil and lubricated and/or cooled.

In the case of the preferred embodiment represented here, a flow connection is thus realized between the two oil sump regions 9a and 9b. In order to realize this flow connection, end plate 10 can have a through opening which is, however, neither explained nor represented here. In the case of the preferred embodiment, an annular gap 14 is provided and/or formed between the outermost circumferential edge of circumferential region 10b and at least one housing part, here in particular between the two housing parts 12a and 12b. As a result of this, oil can flow in particular from second oil sump region 9b into first oil sump region 9a in a calmed, in particular laminar flow, in particular, however, as a result of this, the oil level in both oil sump regions 9a and 9b is then formed to be at the same height level.

As in particular FIGS. 1 and 2 make clear, the transmission 4 has at least two gear wheel stages, wherein the first gear wheel stage is formed from first pinion 4a and gear wheel 4b and the second gear wheel stage is formed from second pinion 4c and axle drive gear wheel 5a. Wheel drive shaft 6 extends at least partially through a passage opening 10g of the end plate 10.

Finally, FIG. 7 shows that, with the aid of end plate 10 and axle drive gear wheel 5a, a targeted oil guidance to oil container 13 can be realized, which is supposed to be represented here by the correspondingly represented arrows. In particular, as a result of the rotation of axle drive gear wheel 5a and the proximate or spatially adjacent arrangement of axle drive gear wheel 5a relative to end plate 10, corresponding oil is conveyed in the direction of oil container 13 or moved into oil container 13.

As FIGS. 1 to 7 make clear in the overall view, with the aid of end plate 10 which can be arranged fixedly on first housing part 12a with corresponding fastening screws not designated in greater detail here, differential 5 or axle drive gear wheel 5a can then be mounted in particular in that a bearing 11 is arranged in bearing retainer 10a of end plate 10 and with the aid of this bearing 11 a shoulder, not designated in greater detail, of the housing of the differential or of axle drive gear wheel 5a can then be mounted on one side. A further second housing part 12b then borders or encloses differential 5 and transmission 4 in a corresponding manner, wherein differential 5 is mounted with the aid of a further bearing 15, as is apparent in particular from FIGS. 1 and 2.

The above-mentioned disadvantages are avoided and corresponding advantages are achieved by the formation according to the invention of drive train 1, in particular of end plate 10 arranged and/or formed in a correspondingly specific manner.

The following is a list of reference numerals used in the above description of the invention with reference to the drawing figures:

1 Drive train
 2 Drive motor, in particular electric machine
 2a Electric motor
 3 Drive shaft
 4 Transmission
 4a First pinion
 4b Gear wheel
 4c Second pinion
 5 Differential
 5a Axle drive gear wheel
 6 First wheel drive shaft
 7 Second wheel drive shaft
 8 Intermediate shaft
 9 Oil sump
 9a First oil sump region
 9b Second oil sump region
 10 End plate
 10a Bearing retainer
 10b Flange-like circumferential region
 10c Support wall
 10d Collar-like wall
 10e Flattened region
 10f Ramp-shaped oil intake region
 10g Passage opening
 11 Bearing
 12 Housing (housing part 12a, housing part 12b)
 13 Oil container
 14 Annular gap
 15 Bearing

The invention claimed is:

1. A drive train for a vehicle, the drive train comprising:
    a drive shaft, a transmission, a differential, and a wheel drive shaft;
    said differential including an axle drive gear wheel in meshing engagement with a gear wheel of said transmission;
    at least one of said axle drive gear wheel or said gear wheel of said transmission being at least in part arranged in an oil sump in a splashing fashion;
    an end plate for mounting said differential, said end plate having a bearing retainer for receiving a bearing;
    said end plate having a flange-shaped circumferential region extending radially in a direction of said oil sump;
    said end plate being disposed and configured to divide said oil sump into a first oil sump region and a second oil sump region; and
    said end plate having a substantially flattened region for placement of at least one oil container radially opposite the direction of said oil sump.

2. The drive train according to claim 1, wherein said first oil sump region is formed with a smaller volume than said second oil sump region and said axle drive gear wheel is arranged in said first oil sump region in a splashing fashion.

3. The drive train according to claim 1, wherein said end plate is configured to prevent, at least partially, a flow of oil from said second oil sump region into said first oil sump region.

4. The drive train according to claim 3, wherein said end plate is configured to enable an inflow of oil between said first and second oil sump regions to be regulated at least partially with said end plate.

5. The drive train according to claim 4, wherein said end plate is configured to enable at least one of a targeted or guided oil collection.

6. The drive train according to claim 1, wherein said bearing retainer of said end plate has a support wall for axial support of a bearing arranged in at least one of said bearing retainer or said circumferential region of said end plate and said support wall lie substantially in a plane.

7. The drive train according to claim 6, wherein said bearing retainer is delimited at least in part by a collar-shaped wall which runs in an annular manner substantially perpendicular to the plane of at least one of said support wall or said circumferential region.

8. The drive train according to claim 1, wherein the end plate has, for lubrication of a bearing disposed in said bearing retainer, an oil intake region which is formed at least partially ramp-shaped and which can be at least one of fluidically connected or supplied with oil from an oil container.

9. The drive train according to claim 1, wherein said end plate is formed with at least one of a through opening for a flow connection between said first and second oil sump regions or an annular gap is provided is formed between an outermost circumferential edge of said circumferential region and a housing of the drive train.

10. The drive train according to claim 1, wherein said transmission has at least two gear wheel stages.

11. The drive train according to claim 1, wherein said wheel drive shaft extends at least partially through a passage opening formed in said end plate.

12. The drive train according to claim 1, wherein said end plate and said axle drive gear wheel are configured to enable a targeted supply of oil to an oil container.

13. The drive train according to claim 1, being a drive train of a motor vehicle.

* * * * *